United States Patent
Suzuki

(10) Patent No.: US 6,307,539 B2
(45) Date of Patent: Oct. 23, 2001

(54) DATA INPUT APPARATUS

(75) Inventor: Katsutoshi Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/095,684

(22) Filed: Jun. 10, 1998

(30) Foreign Application Priority Data

Jun. 19, 1997 (JP) .................................................. 9-162887

(51) Int. Cl.⁷ ..................................................... G09G 5/08
(52) U.S. Cl. ........................... 345/167; 345/162; 345/159
(58) Field of Search ..................................... 345/156–159, 345/160, 162, 163–167, 169; 463/37, 36; 273/148 B; 341/20–21; 348/734

(56) References Cited

U.S. PATENT DOCUMENTS

| 4,963,858 | * | 10/1990 | Okamoto et al. | ..................... 345/157 |
|---|---|---|---|---|
| 5,164,713 | * | 11/1992 | Bain | ..................................... 345/145 |
| 5,398,044 | * | 3/1995 | Hill | ..................................... 345/145 |
| 5,473,344 | | 12/1995 | Bacon et al. . | |
| 5,504,500 | * | 4/1996 | Garthwaite et al. | .................. 345/157 |
| 5,880,703 | * | 3/1999 | Hashimoto | ........................... 345/169 |
| 5,910,798 | * | 6/1999 | Kim | ..................................... 345/163 |
| 5,963,195 | * | 10/1999 | Gregg et al. | .......................... 345/159 |

* cited by examiner

Primary Examiner—Lun-Yi Lao
(74) Attorney, Agent, or Firm—Brinks Hofer Gilson & Lione

(57) ABSTRACT

A operation member drives an X encoder and a Y encoder. According to the output pulses of both encoders, a figure displayed on a screen moves or rotates. When a finger touches a touch-sensitive switch immediately after the operation member is operated, the figure continues moving or rotating on the screen at the same speed as the operation speed at which the operation member was operated. When the finger is released from the touch-sensitive switch, the figure stops moving or rotating. When the touch-sensitive switch is again touched, the figure resumes moving or rotating.

2 Claims, 5 Drawing Sheets

DATA INPUT APPARATUS

BACKGROUND OF THE INVENTION

1. Field of the Invention

The present invention relates to input apparatuses for moving a pointer or a figure displayed on a computer screen, and more particularly, to a data input apparatus providing easy operation even for large movement on the screen.

2. Description of the Related Art

As a data input apparatus for a computer, there have been used various types of apparatuses, such as a mouse type operated on a desk, a trackball type in which a spherical ball is operated, built in a notebook-type personal computer or used as a single unit, a touch-sensitive pad type which the user rubs by a finger, and a joystick type. With these input apparatuses, a character for indicating the current position, such as a cursor and a pointer, displayed on a computer screen is moved to the desired position.

FIG. 5 is a plan of a conventional data input apparatus employing a trackball.

A spherical operation member 1 called a trackball is supported rotatably in the three-dimensional space and drives an X encoder 2 and a Y encoder 3.

The X encoder 2 has a roller 2a rotating about an axis extending in the Y direction and a circular plate 2b rotating together with the roller 2a. At the periphery of the circular plate 2b, notches are formed at a certain interval in the circumferential direction. A optocoupler 2c is disposed at part of the periphery of the circular plate 2b so as to sandwich the plate. In the optocoupler 2c, a light-emitting device and a light-receiving device are disposed oppositely, and the periphery of the circular plate 2b is disposed between the light-emitting device and the light-receiving device. When the roller 2a and the circular plate 2b rotate, a pulse output having the frequency corresponding to the rotation speed of the circular plate 2b is obtained from the optocoupler 2c as an operation signal.

In the same way, the Y encoder 3 has a roller 3a rotating about an axis extending in the X direction, a circular plate 3b rotating together with the roller 3a, and an optocoupler 3c disposed at a part of the periphery of the circular plate 3b so as to sandwich the plate. At the periphery of the circular plate 3b, notches are formed at a certain interval in the circumferential direction. A pulse output having the frequency corresponding to the rotation speed of the roller 3a and the circular plate 3b is obtained from the optocoupler 3c.

A general input operation will be described below in a case when this trackball-type input apparatus is connected to a computer.

When the spherical operation member 1 is rotated in the X direction, the roller 2a and the circular plate 2b of the X encoder 2 rotate. A pulse output is obtained from the optocoupler 2c and is converted to coordinate data. When this coordinate data is input to the computer, a cursor, a pointer or a character displayed on a screen connected to the computer is moved in the X direction. When the spherical operation member 1 is rotated in the Y direction, the roller 3a and the circular plate 3b of the Y encoder 3 rotate. A pulse output obtained from the optocoupler 3c is converted to coordinate data. When this coordinate data is input to the computer, the cursor or the pointer is moved in the Y direction on the screen.

When the operation member 1 is rotated, for example, in the direction indicated by $\alpha$, which is at angles from the X and Y axes, both rollers 2a and 3a rotate. Pulses obtained from the optocouplers 2c and 3c are converted to coordinate data, and the cursor or the pointer is moved in the direction indicated by $\alpha$ on the screen.

According to the screen size and the movement speed of the cursor, the operation member 1 is rotated once or a plurality of times to move the cursor to the desired position in the two-dimensional manner.

When the screen size of a display unit connected to the computer is large, it may be required to move the cursor or the pointer long. In this case, by the use of the trackball-type input apparatus, the operation member 1 (trackball) needs to be rolled a number of times by a finger and hence easy operation is not provided.

In a usual touch-sensitive-pad-type input apparatus, the pad is rubbed by the digital pulp of a finger. When the cursor needs to be moved long, like the situation for the trackball-type input apparatus, inputs are repeatedly required by reciprocating the finger on the pad. This operation is troublesome.

A mouse-type input apparatus can move in a limited area due to the use of a mouse pad or a space on a desk. Therefore, to move the cursor or the pointer long, it is necessary to reciprocate the mouse a number of times. Easy operation is not provided.

With the use of a joystick-type input apparatus, the cursor or the pointer can be moved just by leaning the stick section in the desired direction and the movement continues while the stick section is being leaned. Whereas the cursor can be continuously moved with the use of the joystick-type input apparatus without reciprocating a hand or a finger a number of times, the apparatus is unsuitable for precise positioning on the screen.

To reduce reciprocative movement of a hand or a finger, the movement speed of the cursor or the pointer can be increased by a setting of an input apparatus or an internal setting of the computer to extend a movement distance. When the movement speed of the cursor or the pointer is very high, precise positioning is difficult to achieve. Although the diameter of the trackball can be extended or the area of a touch-sensitive pad or the mouse pad can be enlarged, the condition is not improved due to a space required for installation on the computer or the desk.

SUMMARY OF THE INVENTION

Accordingly, it is an object of the present invention to provide a data input apparatus having a usual size, which allows a character on a screen, such as a cursor or a pointer, to be easily operated without reciprocating a hand or a finger a number of times even when a large movement is required on the screen, and which can be easily used for precise positioning.

The foregoing object is achieved according to the present invention through the provision of a data input apparatus including: an operation member operated by a hand; an encoder for outputting a operation signal according to the operation of the operation member; signal storing means for storing the operation signal sent from the encoder; coordinate-data generating means for generating coordinate data according to the output of the signal storing means; detecting means operable by a hand; and control means for continuously outputting the operation signal stored in the signal storing means to the coordinate-data generating means while a detection state continues if the detecting means is set to the detection state by a hand when the operation member is being operated or immediately after the operation has been completed.

In the present invention, when the operation member is operated, the operation signal from the encoder is stored in the signal storing means such as a register. When the detecting means is set to a detection state during the operation of the operation member, or when the detecting means is set to a detection state immediately (for example, within one second) after the operation member is operated, coordinate data continues being output according to the operation signal stored in the signal storing means.

Therefore, when the operation member is operated, a figure is moved or rotated on the screen at the speed corresponding to the operation speed. If the detecting means is being set to the detection state, the figure continues being moved or rotated at the operation speed being maintained.

In the data input apparatus, the detecting means is preferably provided in the vicinity of the operation member so that a hand can touch the detecting means immediately after the operation member is operated.

The detecting means includes a touch-sensitive switch provided in the vicinity of the operation member. The touch-sensitive switch may be that set to a detection state by the touch of a hand, or a pressure-sensitive switch which is set to a detection state when it is pressed by a finger. It may be a pushbutton switch provided in the vicinity of the operation member. Such detecting means is preferably provided at a position where it can be easily touched by a finger after the operation member is touched by the finger. The detecting means may be provided away from the operation member. An assigned key on the keyboard may be used as the detecting means.

The data input apparatus may be controlled such that the operation signal stored in the signal storing means is continuously output to the coordinate-data generating means while a detection state continues if the detecting means is again switched to the detection state when the signal storing means stores the operation signal from the encoder and a hand is released from the detecting means to set it to an undetection state.

In this case, when the operation member is operated and then the detecting means is touched by a finger, if the finger is released and again touches the detecting means, the figure is moved on the screen at the same speed as when the operation member was operated.

The data input apparatus is preferably controlled such that the data stored in the signal storing means is released if the detecting means is not switched to a detection state by a hand immediately after the operation member is operated and the operation signal is obtained from the encoder.

For example, when the detecting means is touched by a finger immediately after the operation member is first operated, the operation signal related to the operation of the operation member is stored in the signal storing means. Each time the detecting means is touched by a finger, the operation signal is output from the signal storing means and the figure continues moving or rotating on the screen always at the same speed. If the operation member is operated afterwards and the detecting means is not touched by a finger this time to leave it in an undetection state, the signal storing means is reset and the operation returns to a normal operation. Whether the detecting means is set to a detection state immediately after the operation member is operated is determined by a time measurement, by the use of a timer, performed after the operation member is operated and the operation signal is output from the encoder. If the detecting means is not set to a detection state within one second, for example, the signal storing means is reset.

The data input apparatus may be controlled such that a new operation output is continuously sent from the signal storing means to the coordinate-data generating means while a detection state of the detecting means continues if the operation member is operated, a new operation signal is obtained from the encoder, and the signal storing means stores the new operation signal, when the detecting means is in the detection state by a hand.

In other words, while a finger touches the detecting means if the operation member is again operated, a new operation signal is stored in the signal storing means and continuously output. When a finger touches the detecting means and the figure is moving or rotating, for example, the movement speed or the rotation speed can be changed by a new operation of the operation member.

In the present invention, the operation member may be formed of a ball or a touch-sensitive pad. A rotating roller may be used as an operation member.

With the above-described configuration, a data input apparatus according to the present invention allows a character displayed on a computer screen, such as a cursor or a pointer, to be moved continuously just by turning on the detecting means after the operation member is operated, without reciprocating a finger a number of times even when the character needs to be moved long. Since movement can be stopped or resumed freely and the movement speed can be controlled, precise positioning is easily performed at the desired point.

DESCRIPTION OF THE PREFERRED EMBODIMENT

Figure 1:
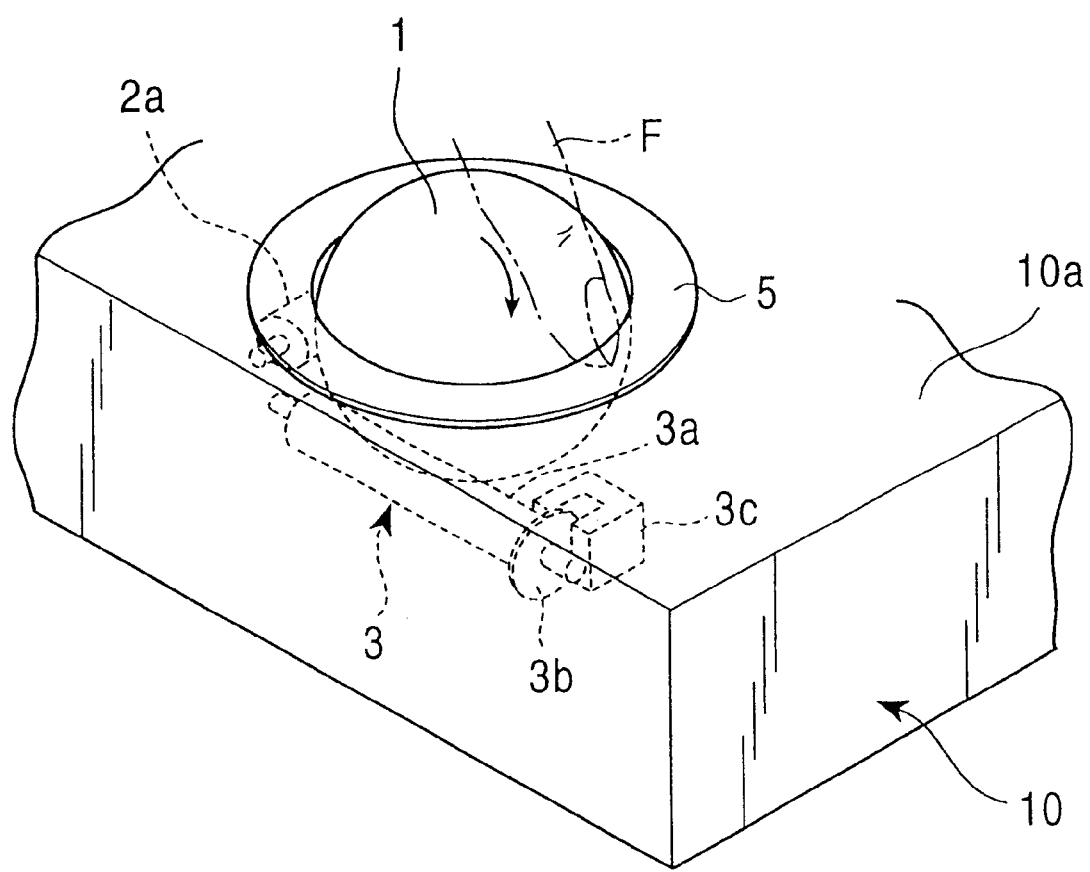
FIG. 1 is a perspective view of a data input apparatus according to the present invention.
Figure 1:
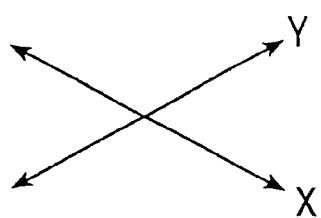
Figure 2:
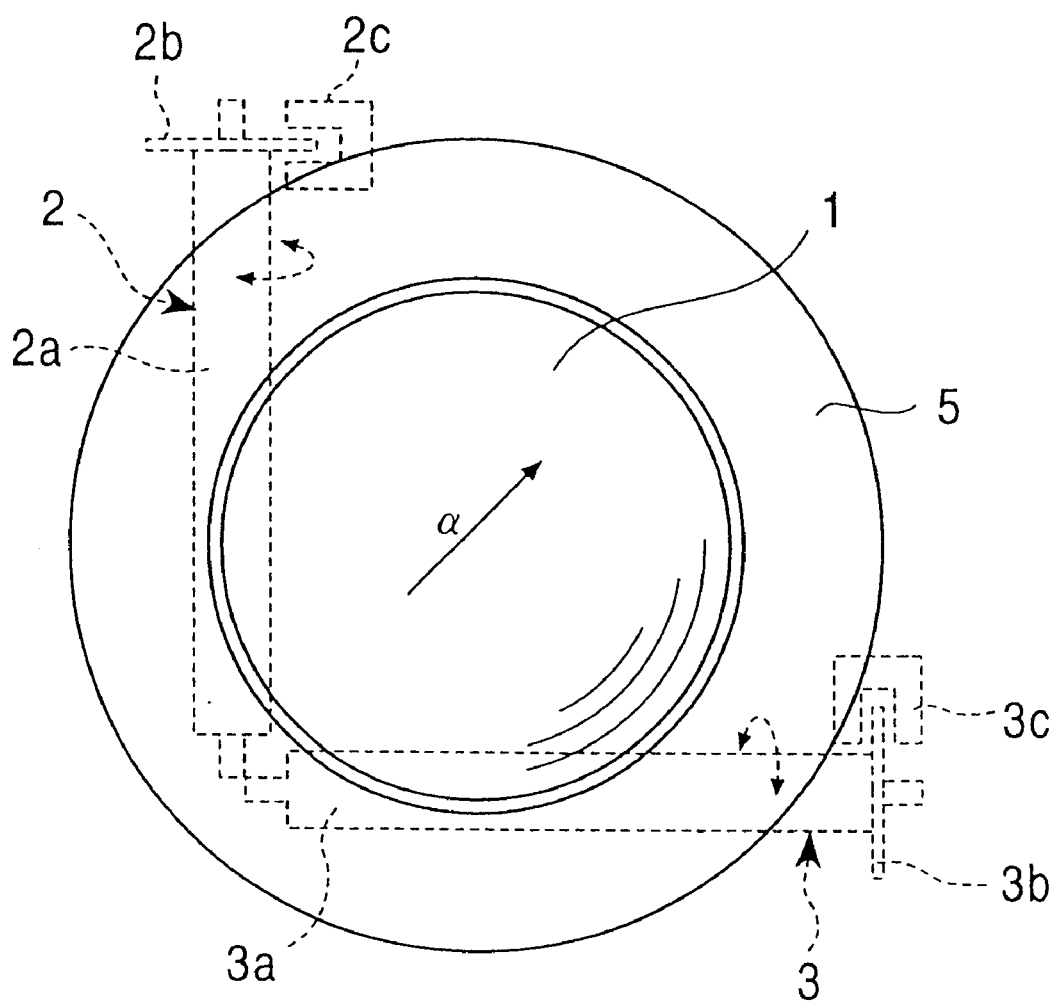
FIG. 2 is a plan of the data input apparatus.
Figure 3:
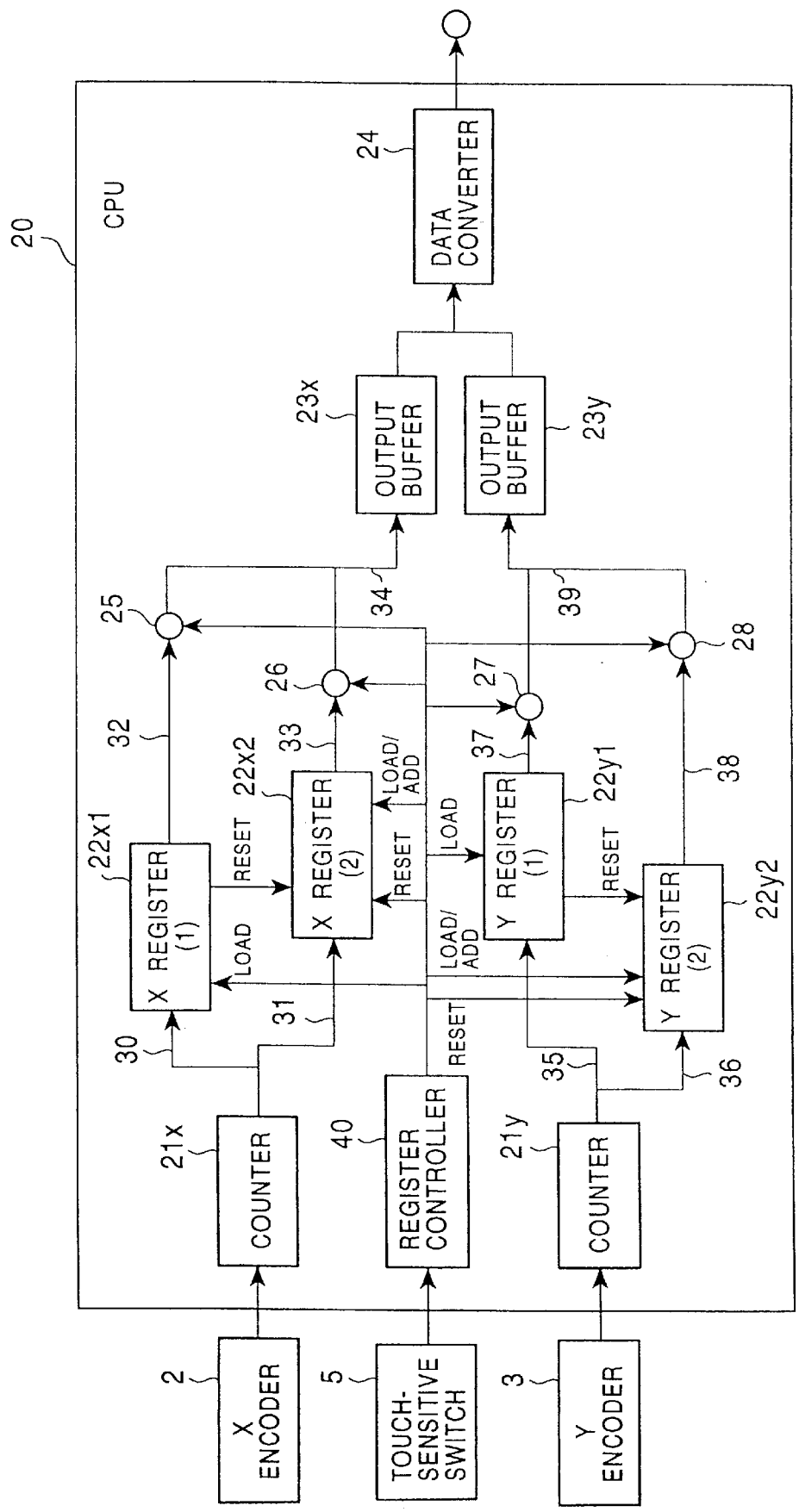
FIG. 3 is a block diagram showing a circuit configuration of the data input apparatus.

FIG. 1 is a perspective view of a data input apparatus according to the present invention. FIG. 2 is a plan of the data input apparatus, and FIG. 3 is a block diagram showing a circuit configuration of the data input apparatus.

There is shown in FIG. 1 a body case 10 of the data input apparatus. The body case 10 may be a separate entity or a part of a keyboard housing.

A spherical operation member 1 called a ball is supported rotatably about the X axis and the Y axis. The equator of this operation member 1 is positioned below the surface 10a of the body case 10. When the operation member 1 is rotated by a finger, the finger touches the operation member 1 at a section above the equator.

Figure 5:
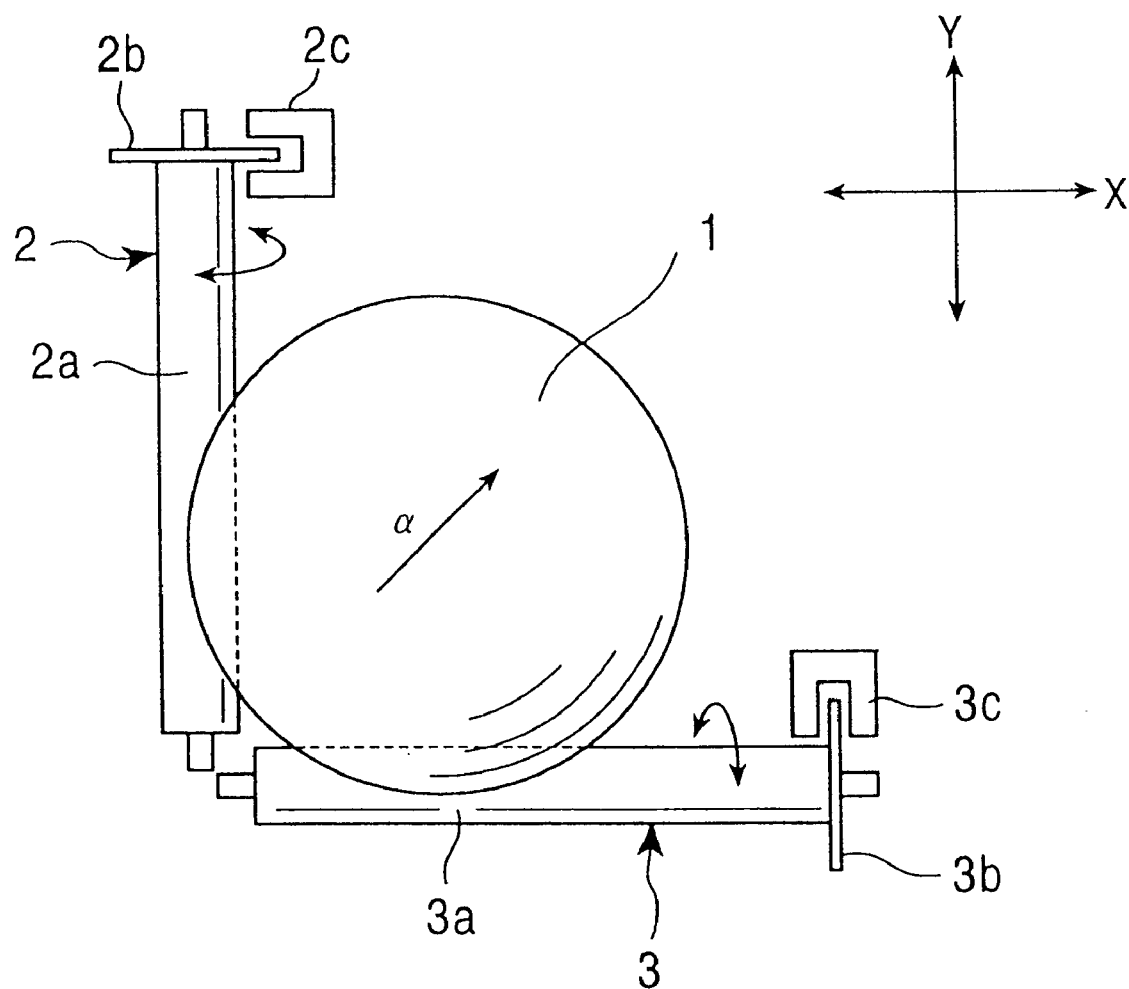
FIG. 5 is an outlined plan of a structure of a conventional data input apparatus.

Inside the body case 10, an X encoder 2 and a Y encoder 3 are disposed in the same way as in the conventional case shown in FIG. 5.

As shown in FIG. 2, the X encoder 2 has a roller 2a, a circular plate 2b having notches formed at the periphery at a certain interval, and an optocoupler 2c disposed so as to sandwich a part of the periphery of the circular plate 2b. The Y encoder 3 has a roller 3a, a circular plate 3b having notches formed at the periphery at a certain interval, and an optocoupler 3c.

When the spherical operation member 1 is rotated by a finger, the roller 2a and/or the roller 3a is rotated by the operation member 1, and a pulse output having the frequency corresponding to the rotation speed is obtained from the optocoupler 2c and/or the optocoupler 3c. The optocouplers 2c and 3c each are provided with two pairs of light-emitting devices and light-receiving devices for detecting the notches. Since a first pair of a light-emitting device and a light-receiving device and a second pair of a light-emitting device and a light-receiving device detect a notch at different phases, the direction of rotation of each of the rollers 2a and 3a can be detected.

At the surface 10a of the body case 10, provided at the periphery of the spherical operation member 1, a touch-detection-type or pressure-sensitive-detection-type touch-sensitive switch 5 is provided. This touch-sensitive switch 5 has a ring shape surrounding the periphery of the operation member 1 and is provided close to the operation member 1. When the user finishes rotating the operation member 1 by a finger F in a certain direction, the user can easily touch the touch-sensitive switch 5 by the finger F.

The circuit configuration of the data input apparatus will be described by referring to FIG. 3.

In this embodiment, pulse outputs sent from the X encoder 2 and the Y encoder 3 are waveform-processed and directly input to a CPU 20 of a computer. The detection output of the touch-sensitive switch 5 is also input to the CPU 20 through a certain interface.

The signals input to the CPU 20 are processed according to software programmed in advance. FIG. 3 shows the processing stages by the circuit configuration. Therefore, a circuit corresponding to the block diagram of FIG. 3 may be configured on a circuit board.

In the block diagram shown in FIG. 3, the pulse outputs of the X encoder 2 and the Y encoder 3 are counted by counters 21x and 21y, respectively. The counters 21x and 21y count the pulses from the X encoder 2 and the Y encoder 3 with the use of a certain clock pulse as a reference. The pulse outputs having the frequencies proportional to the rotation speeds of the roller 2a and the roller 3a, namely operation signals, are obtained.

The operation signals obtained from the counters 21x and 21y are stored in any of a register group 22 serving as signal storing means, according to the on/off state of the touch-sensitive switch 5, provided at the periphery of the operation member 1. The stored signals are sent to output buffers 23x and 23y, converted to coordinate data on the screen of a display unit by a data converter 24, and then output to the computer screen. In this configuration, a coordinate-data generating section is formed of the output buffers 23x and 23y and the data converter 24.

The detection output of the touch-sensitive switch 5 is input to a register controller 40 serving as control means. The register controller 40 controls registers 22x1, 22x2, 22y1, and 22y2, and switches 25, 26, 27, and 28.

The pulse output of the optocoupler 2c in the X encoder 2 is counted by the counter 21x, and when the touch-sensitive switch 5 is off, the count (operation signal) is loaded into the X register(1) 22x1 through a line 30 and the switch 25 opens to connect a line 32 to a line 34. Therefore, the loaded count is sent to the output buffer 23x through the lines 32 and 34, then sent to the data converter 24 for converting to coordinate data, and output to an image processing section. When the count is loaded into the X register(1) 22x1, if the X register(2) 22x2 has a count, the count is cleared.

When the touch-sensitive switch 5 is on, the count is loaded into the X register(2) 22x2 through a line 31, and the switch 25 is closed and the switch 26 is opened. A line 33 is connected to the line 34. The loaded count is sent to the output buffer 23x and to the data converter 24 through the lines 33 and 34, and output as coordinate data. When the on state of the touch-sensitive switch 5 continues, the X register (2) 22x2 continues adding the counts. Continuous outputs are obtained.

When the touch-sensitive switch 5 becomes off during the addition, the switches 25 and 26 are closed and loading into the output buffer 23x is stopped. An output is not obtained. When the count is loaded into the X register(2) 22x2, if the X register(2) 22x2 has a count, the count is cleared.

The pulse output from the Y encoder 3 can be described in the same way as for the X encoder 2. The pulse output is counted by the counter 21y, and when the touch-sensitive switch 5 is off, the count is loaded into the Y register(1) 22y1 through a line 35 and the switch 27 opens to connect a line 37 to a line 39. Therefore, the loaded count is sent to the output buffer 23y and to the data converter 24 through the lines 37 and 39, and output. When the count is loaded into the Y register(1) 22y1, if the Y register(2) 22y2 has a count, the count is cleared.

When the touch-sensitive switch 5 is on, the count is loaded into the Y register(2) 22y2 through a line 36, and the switch 27 is closed and the switch 28 is opened. A line 38 is connected to the line 39. The loaded count is sent to the output buffer 23y and to the data converter 24 through the lines 38 and 39, and output. When the on state of the touch-sensitive switch 5 continues, the Y register(2) 22y2 continues adding the counts. Continuous outputs are obtained. When the touch-sensitive switch 5 becomes off during the addition, the switches 27 and 28 are closed and loading into the output buffer 23y is stopped. An output is not obtained.

When the spherical operation member 1 is rotated in the direction indicated by α shown in FIG. 2, both X encoder 2 and Y encoder 3 are rotated at the same time. In this case, the outputs of the X encoder 2 and the Y encoder 3 are processed at the same time.

Figure 4:
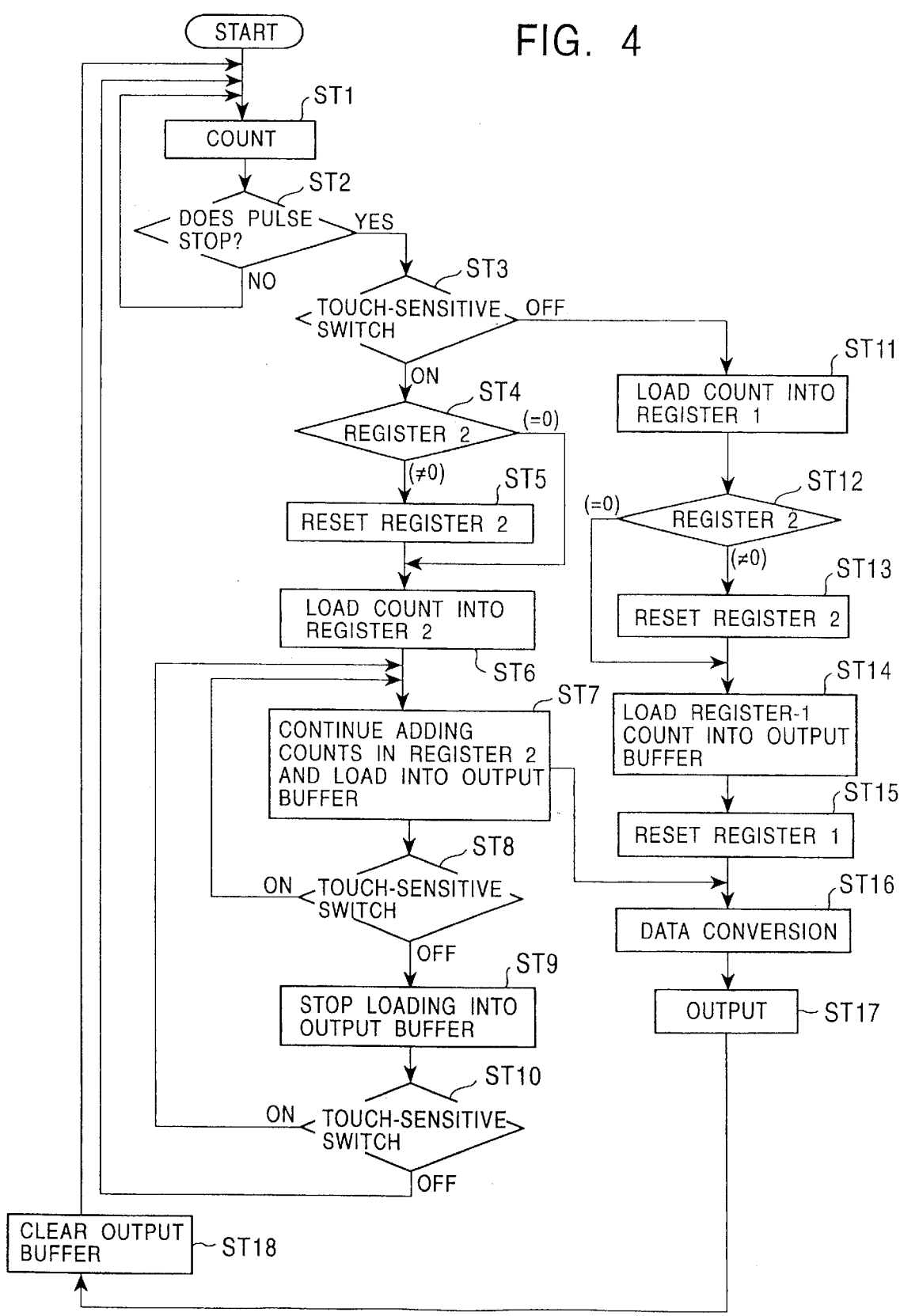
FIG. 4 is an operation flowchart of the data input apparatus.

An operation of the data input apparatus will be described below by referring to a flowchart shown in FIG. 4.

When the spherical operation member 1 is rotated in a direction, only the roller 2a in the X encoder 2 rotates, only the roller 3a in the Y encoder 3 rotates, or both rollers 2a and 3a rotate.

A case in which the operation member 1 is rotated in the X direction will be described. The pulse output of the X encoder 2 is counted by the counter 21x (step 1, hereinafter called ST1). In a step 2 (ST2), it is checked whether a pulse is stopped. When the operation member 1 continues being rotated and the pulse output continues, the procedure returns to the start and the pulse output is continuously counted.

When the spherical operation member 1 stops rotating and the pulse output is stopped, the register controller 40 checks within a certain time period (for example, one second) whether the finger touches the touch-sensitive switch 5, formed at the periphery of the operation member 1 (ST3). When the finger touches the touch-sensitive switch 5, the register controller 40 checks if the X register(2) 22x2 has a count in a step 4 (ST4). If the count remains (is not zero), the X register(2) 22x2 is cleared (ST5), and the count is loaded into the X register(2) 22x2 (ST6). When a count is not left (is zero), the count is loaded into the X register(2) 22x2 (ST6).

When the on state of the touch-sensitive switch 5 continues, the X register(2) 22x2 continues adding the counts and the result is continuously loaded into the output buffer (ST7). The result is converted to movement data on the computer screen (ST16) and output to the screen (ST17).

After the step 7 (ST7), it is checked whether the touch-sensitive switch 5 is on or off (ST8). When the on state of the touch-sensitive switch 5 continues, the X register(2) 22x2 continues adding the counts and the result is loaded into the output buffer (ST7), and it is sent to the data converter (ST16) and to the output section (ST17). In other words, when the on state of the touch-sensitive switch 5 continues after the operation member 1 is operated, a pointer or a figure in an image on the screen continues moving at the movement speed obtained when the operation member 1 was operated. When the operation signal of the operation member 1 indicates figure rotation in the image on the screen, the figure continues rotating at the rotation speed obtained when the operation member 1 was operated.

In the step 8 (ST8), when the finger is released from the touch-sensitive switch 5 to turn it off, loading of the pulse output to the output buffer is stopped (ST9). Movement or rotation on the screen is also stopped at this point of time.

When the touch-sensitive switch 5 again becomes on (ST10), the X register(2) 22x2 again continues adding the counts of the pulse outputs, including that remaining in the register, and the result is loaded into the output buffer (ST7), and sent to the data converter (ST16) and to the output section (ST17) in the same way. Therefore, when the touch-sensitive switch 5 is turned off and then on again, the figure on the screen continues moving or rotating at the same speed as the operation member 1 was operated.

In the step 10 (ST10), when the touch-sensitive switch 5 is turned off, loading to the output buffer 23x is stopped and a data input is stopped. It is checked at this stage whether the operation member 1 is again operated and the pulse output is counted. When the operation member 1 is operated and counting is started, the procedure returns to the start, and the processing is repeated from the beginning.

A case will be described in which the spherical operation member 1 is operated but the touch-sensitive switch 5 is not touched.

In this case, the controller 40 determines in the step 3 that a finger did not touch the touch-sensitive switch 5, formed at the periphery of the operation member 1, within a certain time period after the pulse output is stopped. The count in the counter 21x is loaded into the X register(1) 22x1 (ST11). It is checked whether the X register(2) 22x2 has a count. If the count remains (is not zero), the register controller 40 clears the X register(2) 22x2 (ST13), and the count of the register(1) is loaded into the output buffer 23x (ST14). When the count does not remain (is zero) in the X register(2) 22x2 in the step 12, the count of the X register(l) 22x1 is loaded into the output buffer 23x (ST14). Then, the X register(1) 22x1 is reset (ST15).

The count sent to the output buffer is converted to movement data on the computer screen (ST16) and then output to the screen (ST17).

In other words, when the touch-sensitive switch 5 is not turned on within a certain time period immediately after the operation member 1 is operated, the figure in the image on the screen moves or rotates by the amount of the operation signal output from the X encoder 2 caused by an operation of the operation member 1, namely, by the amount of rotation of the operation member 1. Since the X register(2) 22x2 is cleared in this case, even if a finger touches the touch-sensitive switch 5 after the clear, no change is generated on the screen.

When data is output in the step 17 (ST17), the procedure proceeds to a step 18 (ST18), and the output buffers are cleared.

When the operation member is rotated in the Y direction, the pulse output of the Y encoder 3 is processed in the same circuit configuration as that described above. When the operation member is rotated in the direction indicated by α, the pulse outputs of both X encoder 2 and Y encoder 3 are processed at the same time.

With the above configuration, a character displayed on the screen of the display unit connected to the computer, such as the cursor and the pointer, continues moving or rotating in the X-axis, Y-axis, or diagonal direction while a finger continues touching the touch-sensitive switch 5 after a finger touches the touch-sensitive switch 5 within a certain time period after the rotation of the spherical operation member 1 is stopped.

When the finger is released from the touch-sensitive switch 5, the cursor, the pointer, or the character stops moving or rotating. When a finger touches the touch-sensitive switch 5 to turn it on without operating the operation member 1, the output data stored and remaining in the X register(2) 22x2 or the Y register(2) 22y2 is loaded and the cursor or the pointer resumes moving or rotating at the same speed as when the operation member 1 was operated. When the finger is released from the touch-sensitive switch 5 to turn it off and the operation member 1 starts being operated without touching the touch-sensitive switch 5, new processing starts. In this case, by adjusting the speed and the amount of rotation of the operation member, the speed and the amount of movement of the cursor, or the speed and the amount of rotation of the cursor are adjusted. Only while the operation member 1 is being operated, the cursor is moved or rotated. When the touch-sensitive switch 5 is not touched after the operation member 1 is rotated, since the register(2) 22x2 is cleared, even if the touch-sensitive switch 5 is touched after that, no change is generated on the screen.

In the step 3, when the touch-sensitive switch 5 is turned on after the operation member 1 is operated, the figure in the image on the screen continues moving or rotating. While the on state continues by touching the touch-sensitive switch 5 by a finger F, if the operation member 1 is rotated, the count based on the output of the X encoder 2 and/or the Y encoder 3 is again stored in the X register(2) 22x2 and/or the Y register(2) 22y2, and is continuously output to the output buffer 23x and/or 23y in the step 7.

In other words, when the touch-sensitive switch 5 is turned on immediately after the operation member 1 is operated, the figure in the image on the screen continues moving or rotating according to the operation speed of the operation member 1. In this case, if the operation member 1 is again rotated, the figure continues moving or rotating at the speed at which the operation member 1 is again operated.

A data input apparatus according to the present invention is not limited to that in the above embodiment. The data input apparatus can be modified in various ways, such as in a case in which the operation member is changed from the ball to a plane touch-sensitive pad and a touch-sensitive sensor is provided at the surrounding of the pad.

In the above embodiment, a figure can be moved or rotated on the computer screen two-dimensionally. By pressing an assigned key on the keyboard, or by pressing a switch separately provided to change the mode, three-dimensional processing is allowed.

In the above embodiment, when the touch-sensitive switch 5 is turned on within a certain time period after the operation member 1 is operated, the figure continues moving or rotating. The data input apparatus may be configured such that the figure continues moving or rotating when the touch-sensitive switch 5 is touched during the operation of the operation member 1 and a hand continues touching the touch-sensitive switch 5 after the operation of the operation member 1.

What is claimed is:

1. A track-ball data input apparatus comprising:

a hand-operated ball;

an encoder to output an operation signal according to an operation of the ball;

a signal storing mechanism to store the operation signal sent from said encoder;

a coordinate-data generating mechanism to generate coordinate data according to an output of said signal storing mechanism;

a hand-operated, ring-shaped, touch-sensitive switch disposed in a vicinity of the ball at a periphery of the ball; and a control mechanism to control said coordinate-data generating mechanism, wherein when said switch is not switched to a detection state within a predetermined period of time immediately after said ball is operated and the operation signal is obtained from said encoder, said control mechanism controls said coordinate-data generating mechanism such that storage of said signal storing mechanism is released and coordinate data corresponding to an amount of operation of said ball is generated, when said switch is switched to the detection state within the predetermined period of time immediately after said ball is operated and the operation signal is obtained from said encoder, said control mechanism controls said coordinate-data generating mechanism such that the operation signal output according to the operation of said operating member and stored in said signal storing mechanism is continuously output to said coordinate-data generating mechanism and the coordinate data corresponding to the operation signal is continuously output while the detection state continues, said control mechanism controls said coordinate-generating mechanism such that the operation signal output according to the operation of said operating member and stored in said signal storing mechanism is continuously output to said coordinate-data generating mechanism and the coordinate data corresponding to the operation signal is continuously output while the detection state continues if said switch is again switched to the detection state after said signal storing mechanism stores the operation signal sent from said encoder and the hand is released from said switch to set said switch to an undetection state, said control mechanism controls said coordinate-generating mechanism such that a new operation output is continuously sent from said signal storing mechanism to said coordinate-data generating mechanism and the coordinate data corresponding to the operation signal is continuously output while the detection state continues if said operating member is operated, a new operation signal is obtained from said encoder, and said signal storing mechanism stores the new operation signal, when said switch is in the detection state, when said switch is not switched within the predetermined period of time immediately after said ball is operated, if said switch is operated after the predetermined period to switch said switch to the detection state, coordinate data is not output.

2. The data input apparatus of claim 1, the signal storing mechanism comprising a set of registers, the coordinate-data generating mechanism comprising buffers and a data converter, and the control mechanism comprising a register controller.

* * * * *